No. 892,364. PATENTED JUNE 30, 1908.
W. B. CHRISTIAN.
DISK TRUCK.
APPLICATION FILED MAR. 7, 1908.
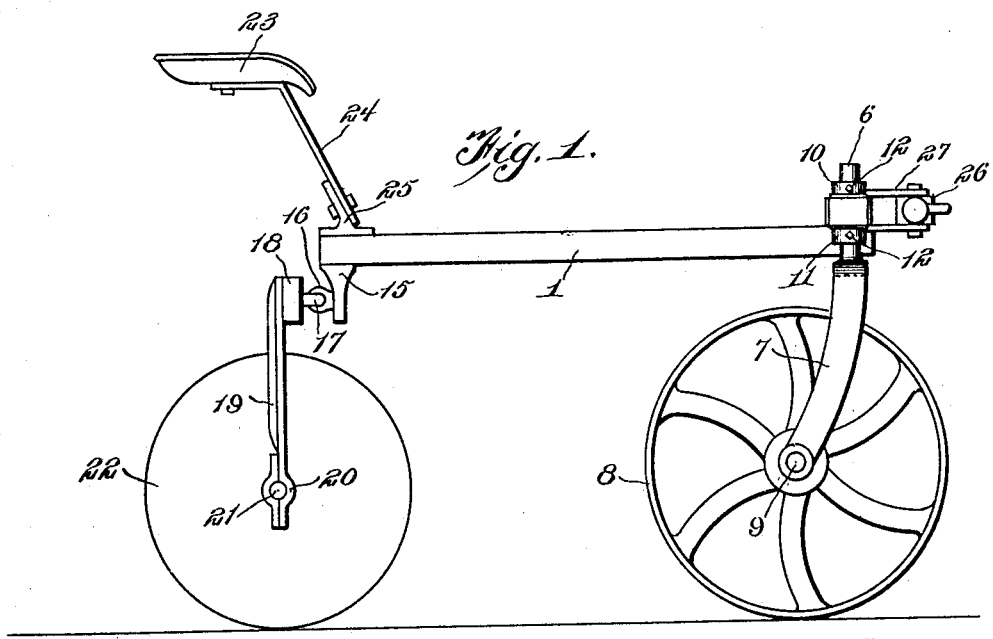
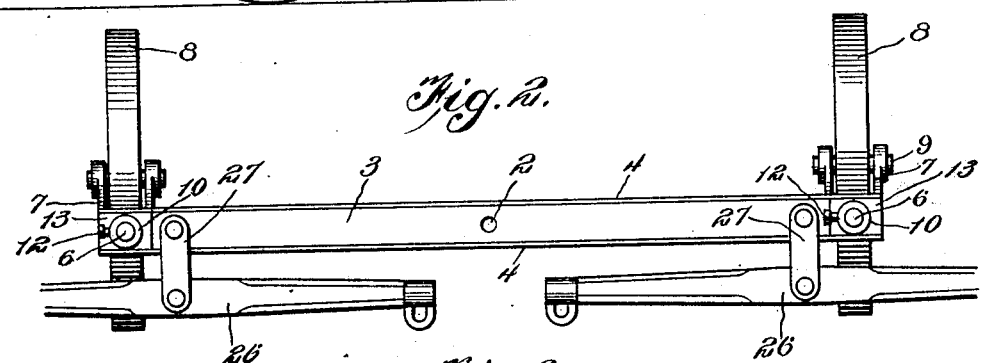
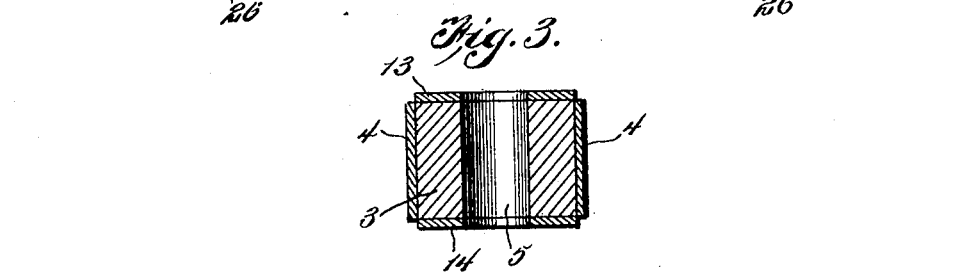
Inventor
William B. Christian
Witnesses
Louis R. Heinrichs.
R. M. Smith.
By Victor J. Evans
Attorney

UNITED STATES PATENT OFFICE.

WILLIAM B. CHRISTIAN, OF DRURY TOWNSHIP, ROCK ISLAND COUNTY, ILLINOIS.

DISK TRUCK.

No. 892,364.  Specification of Letters Patent.  Patented June 30, 1908.

Application filed March 7, 1908. Serial No. 419,715.

*To all whom it may concern:*

Be it known that I, WILLIAM B. CHRISTIAN, a citizen of the United States, residing at Drury township, in the county of Rock Island and State of Illinois, have invented new and useful Improvements in Disk Trucks, of which the following is a specification.

This invention relates to disk trucks the object of the invention being to provide a disk carrying truck for cultivating and harrowing purposes, the construction of which will effect the material reduction of draft on the animals without impairing in any way the efficiency of the machine as a harrow or cultivator.

With the above general object in view, the nature of which will more fully appear as the description proceeds, the invention consists in the novel construction, combination and arrangement of parts as herein fully described, illustrated and claimed.

In the accompanying drawing:—Figure 1 is a side elevation of a disk truck embodying the present invention. Fig. 2 is a plan view of the forward portion thereof. Fig. 3 is an enlarged detail section, showing the manner of reinforcing the draft bar to receive the spindles of the front forks.

The machine contemplated in this invention comprises essentially a main beam or reach bar 1 to the forward end of which is pivotally connected at 2 a transverse draft bar 3 which is preferably composed of wood and provided along its front and rear face with reinforcing irons 4 extending the entire length of said bar and having a width approximately equal to the vertical depth or width of the draft bar as clearly shown in Fig. 3. At or near the opposite ends the draft bar 3 is provided with vertical bearing openings 5 for the spindles 6 of the forks 7 of a plurality of forward supporting wheels 8 as shown in Figs. 1 and 2, the forks 7 having a rearward inclination toward their lower ends where they receive the axles 9 of the wheels 8 thus causing said wheels to control and keep in line with the general direction in which the machine is being drawn by the animals.

Removably fitted upon each of the spindles 6 are upper and lower collars 10 and 11 respectively which are fastened on the spindle by means of set screws 12. These collars 10 and 11 bear against wear plates 13 and 14 arranged respectively on the top and bottom of the draft bar 3 and surrounding the bearing openings. This removes all wear from the wooden draft bar 3 and adds to the life and durability of the machine as a whole.

The rear end of the main beam or reach bar 1 is provided with a bending extension 15 extending rearwardly from which is an eye 16 to which is connected another eye 17 projecting forward from a cross beam 18 to which is secured a plurality of downwardly extending standards 19 having bearings 20 at their lower ends for a transverse shaft 21 upon which is mounted any desired number of disks 22, the gang of disks being thus drawn along by reason of their connection with the main beam or reach bar 1.

23 designates the driver's seat which is supported on the standard 24 extending upward from the main beam or reach bar 1 and connected thereto by means of a bracket 25.

In advance of the draft bar 3 there is arranged a plurality of whiffle trees 26 which are connected centrally to links 27 arranged above and below each whiffle tree and also above and below the draft bar 3, at or near the opposite end thereof, the said links being pivotally connected to the whiffle trees and to the draft bar 3.

From the foregoing description, it will be seen that the usual draft tongue or pole is done away with, the same having been found very objectionable in machines of this character. It will also be seen that by the relative arrangement of the draft bar 3, the trailing forward wheels 8 and the pivotally mounted whiffle trees, the wheels 8 will maintain their proper adjustments with respect to the direction of travel of the machine across the field irrespective of the relative positions of the draft animals one of which may be slightly in advance of the other.

Having thus described the invention, what is claimed as new, is:—

A disk truck comprising a main beam or reach bar, a gang of disks connected with the rear end of said reach bar, a draft bar extending transversely across the forward end of said reach bar, reinforcing irons extending along the front and rear faces of said bar, forward carrying wheels provided with rearwardly inclining forks having vertical spindles passing through openings in the draft bar, wear plates secured to the top and bottom faces of the draft bar and surrounding the spindle openings therein, collars removably fitted on said spindles above and below the draft bar and resting against said wear plates, and whiffle trees arranged in advance of the draft bar and having a jointed connection therewith.

In testimony whereof I affix my signature in presence of two witnesses.

WILLIAM B. CHRISTIAN.

Witnesses:
ANTHONY R. CHRISTIAN,
JOSEPH H. KENES.